US011985432B2

(12) United States Patent
Ogino et al.

(10) Patent No.: US 11,985,432 B2
(45) Date of Patent: May 14, 2024

(54) IMAGE PROCESSING DEVICE AND IMAGE PROCESSING METHOD SUITABLY APPLIED TO BIOMETRIC AUTHENTICATION

(71) Applicant: NEC Corporation, Tokyo (JP)

(72) Inventors: Yuka Ogino, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 323 days.

(21) Appl. No.: 17/437,958

(22) PCT Filed: Feb. 6, 2020

(86) PCT No.: PCT/JP2020/004575
§ 371 (c)(1),
(2) Date: Sep. 10, 2021

(87) PCT Pub. No.: WO2020/195215
PCT Pub. Date: Oct. 1, 2020

(65) Prior Publication Data
US 2022/0166921 A1    May 26, 2022

(30) Foreign Application Priority Data
Mar. 25, 2019  (JP) .................................. 2019-055809

(51) Int. Cl.
*H04N 23/80* (2023.01)
*G06T 5/30* (2006.01)
*G06T 7/571* (2017.01)

(52) U.S. Cl.
CPC ............... *H04N 23/80* (2023.01); *G06T 5/30* (2013.01); *G06T 7/571* (2017.01); *G06T 2207/10016* (2013.01)

(58) Field of Classification Search
CPC .......... H04N 23/80; H04N 23/67; G06T 5/30; G06T 7/571; G06T 2207/10016; G06V 10/993; G06V 40/193; G06V 40/19
(Continued)

(56) References Cited

U.S. PATENT DOCUMENTS

2002/0191075 A1  12/2002  Doi et al.
2003/0152251 A1   8/2003  Ike
(Continued)

FOREIGN PATENT DOCUMENTS

CN   102103248 A    6/2011
CN   102263896 A   11/2011
(Continued)

OTHER PUBLICATIONS

CN Office Action for CN Application No. 202080022132.8, dated Aug. 18, 2023 with English Translation.
(Continued)

*Primary Examiner* — Usman A Khan

(57) ABSTRACT

The image processing apparatus 10 includes image storage means 11 for sequentially storing images continuously captured in time, thinning means 12 for performing a thinning process for the images continuously captured in time, first image evaluation means 13 for performing first focus evaluation on the images after the thinning process is performed, selection means 14 for selecting a plurality of in-focus frame candidates from the images continuously captured in time, based on an evaluation result of the first focus evaluation, second image evaluation means 15 for reading the images of the in-focus frame candidates selected by the selection means 14 from the image storage means 11 and performing second focus evaluation on the read images, and matching image determination means 16 for selecting a matching image for an authentication process from the images of the
(Continued)

in-focus frame candidates, based on an evaluation result of the second focus evaluation.

20 Claims, 11 Drawing Sheets

(58) Field of Classification Search
USPC .................................................... 348/222.1
See application file for complete search history.

(56) References Cited

U.S. PATENT DOCUMENTS

| | | |
|---|---|---|
| 2004/0247032 A1* | 12/2004 | Aihara ................. H04N 19/105 |
| | | 375/E7.1 |
| 2010/0033677 A1 | 2/2010 | Jelinek |
| 2011/0292235 A1 | 12/2011 | Takada et al. |
| 2012/0182393 A1 | 7/2012 | Yagi et al. |
| 2014/0009636 A1 | 1/2014 | Lee et al. |
| 2014/0232928 A1 | 8/2014 | Ono |
| 2015/0071503 A1 | 3/2015 | Prabhakar |
| 2015/0109513 A1 | 4/2015 | Nayar et al. |
| 2015/0199826 A1* | 7/2015 | Jessen ......................... G06T 7/12 |
| | | 382/103 |
| 2016/0359833 A1 | 12/2016 | An et al. |

FOREIGN PATENT DOCUMENTS

| | | |
|---|---|---|
| CN | 102693115 A | 9/2012 |
| CN | 103546682 A | 1/2014 |
| CN | 104349019 A | 2/2015 |
| CN | 104603796 A | 5/2015 |
| CN | 106250738 A | 12/2016 |
| CN | 108778139 A | 11/2018 |
| EP | 1171996 B1 | 7/2010 |
| JP | 2001-257929 A | 9/2001 |
| JP | 2002-122899 A | 4/2002 |
| JP | 2002-341406 A | 11/2002 |
| JP | 2004-226729 A | 8/2004 |
| JP | 2005-244549 A | 9/2005 |
| JP | 2006-303897 A | 11/2006 |
| JP | 2013-101551 A | 5/2013 |
| JP | 2016-534474 A | 11/2016 |
| WO | 2013/061947 A1 | 5/2013 |
| WO | 2014/054296 A1 | 4/2014 |

OTHER PUBLICATIONS

Extended European Search Report for EP Application No. EP20779914.9 dated Apr. 4, 2022.

Matey J R et al: "Iris on the Move: Acquisition of Images for Iris Recognition in Less Constrained Environments", Proceedings of The IEEE, IEEE. New York, US, vol. 94, No. 11, Nov. 1, 2006 (Nov. 1, 2006), pp. 1936-1947.

Anonymous: "Developed Japan's First Walk-through Iris Recognition System", Aug. 3, 2007 (Aug. 3, 2007), pp. 1-3.

Communication dated Jun. 27, 2023 issued by the Japanese Intellectual Property Office in counterpart Japanese Application No. 2022-095689.

CN Office Action for CN Application No. 202080022132.8, dated Nov. 3, 2022 with English Translation.

International Search Report for PCT Application No. PCT/JP2020/004575, dated Mar. 24, 2020.

English translation of Written opinion for PCT Application No. PCT/JP2020/004575, dated Mar. 24, 2020.

"Japan's first walk-through iris authentication system developed", Aug. 3, 2007, [online], Matsushita Electric Industrial Co., Ltd., [retrieved Feb. 20, 2019], Internet <URL:https://news.panasonic.com/jp/press/data/jn070803-1/jn070803-1.html>, pp. 1-3.

* cited by examiner

RESULT OF TIME-SERIES FOCUS EVALUATION BASED ON HIGH-FREQUENCY COMPONENT

RESULT OF TIME-SERIES COARSE FOCUS EVALUATION USING TEMPORAL THINNING (EVERY 10 FRAMES)

RESULT OF TIME-SERIES COARSE FOCUS EVALUATION
USING TEMPORAL AND SPATIAL THINNING
(EVERY 20 FRAMES, THREE PIXELS ARE
THINNED FOR EVERY FOUR PIXELS)

RESULT OF TIME-SERIES COARSE FOCUS EVALUATION
USING SPLINE APPROXIMATION IN ADDITION TO TEMPORAL AND
SPATIAL THINNING (EVERY 20 FRAMES, THREE PIXELS ARE
THINNED FOR EVERY FOUR PIXELS)

IMAGE PROCESSING DEVICE AND IMAGE PROCESSING METHOD SUITABLY APPLIED TO BIOMETRIC AUTHENTICATION

This application is a National Stage Entry of PCT/JP2020/004575 filed on Feb. 6, 2020, which claims priority from Japanese Patent Application 2019-055809 filed on Mar. 25, 2019, the contents of all of which are incorporated herein by reference, in their entirety.

TECHNICAL FIELD

This disclosure relates to an image processing device and an image processing method that are suitably applied to biometric authentication.

BACKGROUND ART

In contactless authentication such as iris authentication using images, a target (for example, a person) or a part of it of authentication is first captured and a pattern of the target (for example, iris) of the authentication process is obtained. Next, the obtained pattern is converted into a feature. Then, authentication is performed by matching the feature with features registered in the database in advance.

In contactless authentication using images, if the pattern is fine, clarity and resolution of the pattern affect authentication accuracy. Therefore, it is required that sufficient resolution is ensured and that a subject including the target of the authentication process is captured in focus.

A focusing range (depth of field) of a camera can be approximately represented by equation (1).

$$\text{DoF(Depth of field)} = (2 \cdot p^2 \cdot N \cdot \text{CoC})/f^2 \quad (1)$$

In equation (1), N is a F-number (lens aperture). p is a distance from the camera to the subject. f is a lens focal length. CoC (Circle of Confusion) is a diameter of permissible circle of confusion. The diameter of permissible circle of confusion indicates a blurring degree (a diameter of circle of confusion) that can be considered in focus. For example, the pixel size of an image sensor used for image capture is used as the diameter of permissible circle of confusion.

As an example, in a camera system to which high-resolution imaging of an iris with a diameter of 12 mm is required in a situation where the subject is about 2 m away, the depth of field is about 10 mm when a telephoto lens with a focal length of about 200 mm is used and the F-number is set to 8.

As mentioned above, since the depth of field of a camera is narrow, obtaining an optimal in-focus image (an image captured within the focusing range) for the authentication process is a problem. Patent literatures 1-3 describe a method for obtaining a suitable in-focus image.

Patent literature 1 describes a method of obtaining an image using a focus lens and setting the focus lens position with the highest high-frequency component in the image as the focus position. Patent literature 2 describes a method of calculating a distance where there is a high probability of capturing an iris image at which degree of focus exceeds a predetermined value, based on a distance to the subject measured by position detection means, and then capturing the subject using the calculated distance as the focus position of the camera.

Patent literature 3 describes a method of capturing a subject with multiple image sensors and selecting an image with the largest amount of high-frequency components as the image for authentication processing.

CITATION LIST

Patent Literature

Patent literature 1: Japanese Patent Laid-Open No. 2002-122899
Patent literature 2: Japanese Patent Laid-Open No. 2004-226729
Patent literature 3: Japanese Patent Laid-Open No. 2005-244549
Patent literature 4: Japanese Patent Laid-Open No. 2002-341406

Non Patent Literature

Non Patent literature 1: "Japan's first walk-through iris authentication system developed", Aug. 3, 2007, [online], Matsushita Electric Industrial Co., Ltd., [retrieved Feb. 20, 2019], Internet <URL:https://news.panasonic.com/jp/press/data/jn070803-1/jn070803-1.html>

SUMMARY OF INVENTION

Technical Problem

In order to provide a practical biometric authentication device, it is required to be able to obtain an in-focus image in a short time.

Walk-through authentication, in which contactless authentication is performed while an authentication target is not stationary but moving, is known (refer to non patent literature 1, for example). In addition, patent literature 4 describes a device that performs iris authentication on a moving person. As described in patent literature 4, walk-through authentication requires faster acquisition of an in-focus image.

For example, assume that a pedestrian as a target of authentication passes through the focusing range 2 m away from a camera at walking speed of 1 m/s. In an imaging environment using a lens with a depth of field of 10 mm, images must be obtained at a frame rate of at least 100 frames per second in order to obtain an in-focus image. Accordingly, when the focus evaluation and the focus change process based on the focus evaluation are conducted to obtain an in-focus image from each frame, the focus change process must be completed in 10 ms per frame.

In addition, the position of the iris within the angle of view differs from person to person. Therefore, when the purpose is to authenticate the iris of a pedestrian from a distance, the degree of focus is calculated after detecting the iris region from an image with a large area other than the iris. In other words, an amount of processing that needs to be completed in 10 ms is even greater.

In the invention described in patent literature 4, an image thinning process is used to obtain an in-focus image at high speed. Specifically, in the invention, after approximate focus is achieved, images are obtained sequentially while the camera is moved, and an optimal in-focus image for the authentication process is selected from the plurality of obtained images.

However, in order to obtain the optimal in-focus image for the authentication process, the camera is physically moved after approximate focus has been achieved, which means that it takes time to obtain the optimal in-focus image.

It is an object of this disclosure to provide an image processing device and an image processing method that can perform biometric authentication processing faster and reduce the time required for biometric authentication processing.

Solution to Problem

An image processing device according to this disclosure includes image storage means for sequentially storing a plurality of images continuously captured in time, thinning means for performing a thinning process for the images continuously captured in time, first image evaluation means for performing first focus evaluation on the images after the thinning process is performed, selection means for selecting a plurality of in-focus frame candidates from the images continuously captured in time, based on an evaluation result of the first focus evaluation, second image evaluation means for reading the images of the in-focus frame candidates selected by the selection means from the image storage means and performing second focus evaluation on the read images, and matching image determination means for selecting a matching image for an authentication process from the images of the in-focus frame candidates, based on an evaluation result of the second focus evaluation.

An image processing method according to this disclosure includes sequentially storing a plurality of images continuously captured in time in image storage means, performing a thinning process for the images continuously captured in time, performing first focus evaluation on the images after the thinning process is performed, selecting a plurality of in-focus frame candidates from the images continuously captured in time, based on an evaluation result of the first focus evaluation, reading the images of the in-focus frame candidates selected from the image storage means and performing second focus evaluation on the read images, and selecting a matching image for an authentication process from the images of the in-focus frame candidates, based on an evaluation result of the second focus evaluation.

An image processing program according to this disclosure causes a computer to execute a process of sequentially storing a plurality of images continuously captured in time in image storage means, a process of performing a thinning process for the images continuously captured in time, a process of performing first focus evaluation on the images after the thinning process is performed, a process of selecting a plurality of in-focus frame candidates from the images continuously captured in time, based on an evaluation result of the first focus evaluation, a process of reading the images of the in-focus frame candidates selected from the image storage means and performing second focus evaluation on the read images, and a process of selecting a matching image for an authentication process from the images of the in-focus frame candidates, based on an evaluation result of the second focus evaluation.

Advantageous Effects of Invention

According to this disclosure, the time required for biometric authentication process can be reduced.

DESCRIPTION OF EMBODIMENTS

In order to shorten the time required for biometric authentication processing, there is a possible method of capturing a series of images of an approaching subject at a high frame rate using a fixed-focus lens without focusing on the movement and depth of the subject. In other words, it is conceivable to capture a group of images including the in-focus image at high speed through a fixed-focus lens. This method assumes that the walking subject always passes through the focusing range including the lens focus position.

When all the images obtained by the above method are converted into features and then matched with the features stored in the feature database, the matching process takes an enormous amount of time. There is a trade-off between the time required for the matching process and the matching accuracy. The matching accuracy depends on a resolution of the input image. The higher the resolution of the image, the larger the amount of data. If the collation accuracy is high, the processing time will exceed the required time (for example, 10 ms).

In particular, when a large number of authentication targets must be handled in a short period of time, the need to shorten the time from capturing a group of images for a single authentication target to obtaining a result of the matching process becomes even greater.

For example, when considering a moving subject, it is desirable that the subject is captured at a high frame rate of at least 100 frames/s when the authentication target is a pedestrian, as described above. Therefore, the number of images captured of the subject is very large. Since the processing time will be long when the matching process is executed for all of the captured images, it is preferable that the images to be subjected to the matching process are selected from a group of images in advance (for example, before the selection of images to be subjected to the matching process is executed). The images to be selected are those captured within the focusing range. The process of selecting images to be subjected to the matching process from the image group is hereinafter referred to as the image evaluation process.

However, since it is desirable to use images with a large number of pixels in order to increase the resolution of the image, executing the image evaluation process for all the images in the image group will increase the processing time of the image evaluation process.

Accordingly, as described below, example embodiments disclose an image processing device and an image processing method that can reduce the time required for image evaluation processing.

Figure 1:
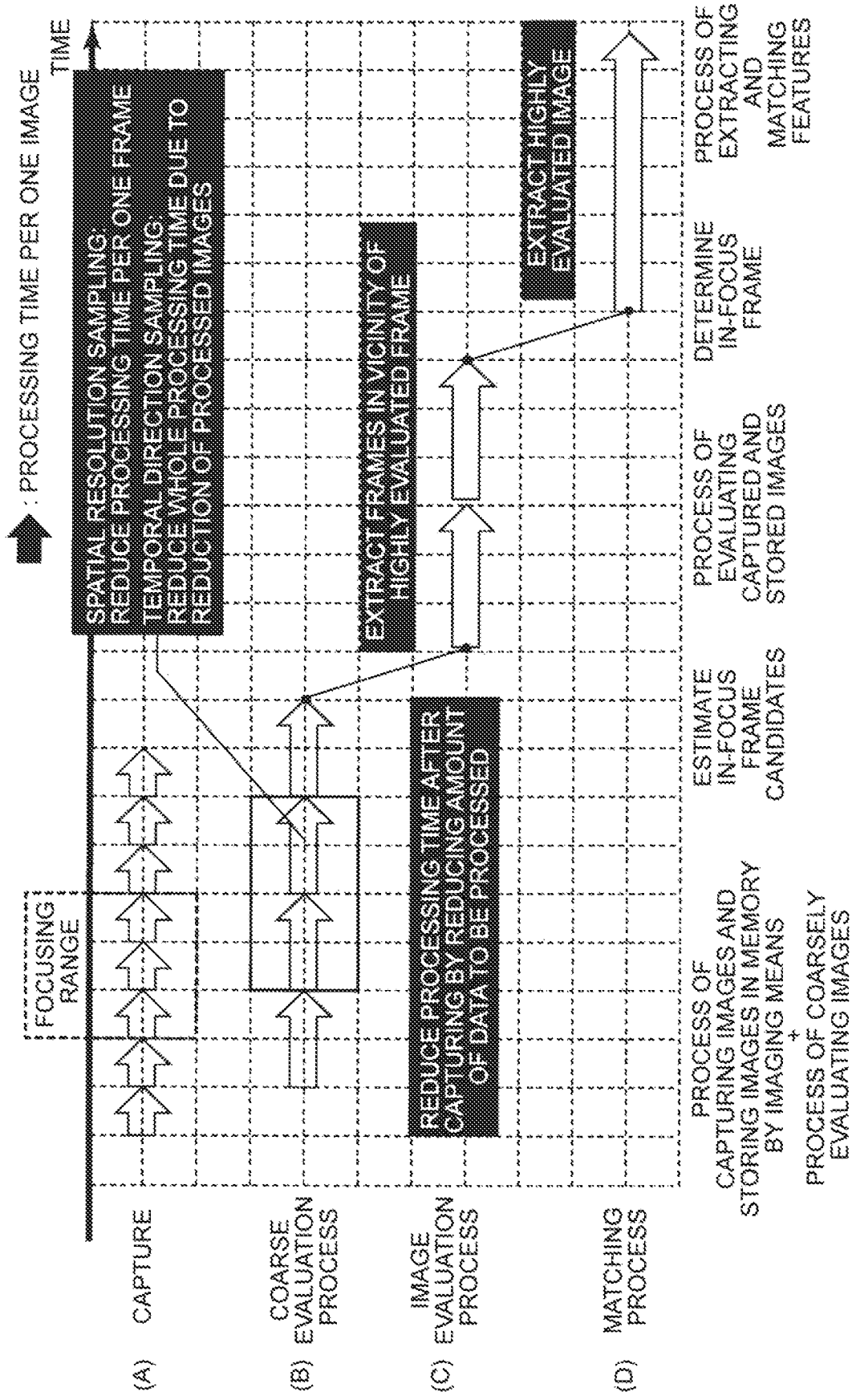
FIG. 1 It depicts a processing flow of an image processing method executed by an image processing device.

FIG. 1 illustrates a processing flow of an image processing method executed by an image processing device of an example embodiment. In FIG. 1, the arrows indicate the processing time per image.

In FIG. 1, (A) shows a processing time for image capture (from the start of image capture by imaging means (for example, a camera) to the recording of the image in memory). (B) shows the processing time of a coarse evaluation process. (C) shows the processing time for image evaluation in time-series order for images recorded in the memory. (D) shows the processing time for calculating matching results for images that are determined to be in focus (images that are determined to be optimal for matching).

The coarse evaluation process starts once at least one image has been written to memory. The coarse evaluation process is performed by either spatially thinning pixels of the image or temporally thinning the image (i.e., thinning the image itself, i.e., the frame), and determining whether or not each image is an image captured within the focusing range for the spatially or temporally thinned image. In other words, in the coarse evaluation process, in-focus frame candidates are estimated by coarsely evaluating the thinned time series data regarding focus. The in-focus frame candidate is an image that has a high probability of having been captured within the focusing range.

Since the in-focus frame candidates obtained by the coarse evaluation process are images selected from a group of images that have been thinned out in the spatial or temporal direction, they may not be optimal matching images. In the image evaluation process, by performing focus evaluation on multiple un-thinned images (images of in-focus frame candidates) before and after the image with the high evaluation value, the matching image can be extracted through a more accurate evaluation. The matching image is an image that is used in the authentication process.

The process shown in FIG. 1 reduces the number of images subject to focus evaluation compared to the case where the image evaluation process (focus evaluation process) is performed on all captured images. Therefore, the series of processing time from image capture to the time when the matching process can be started is reduced.

Figure 2:
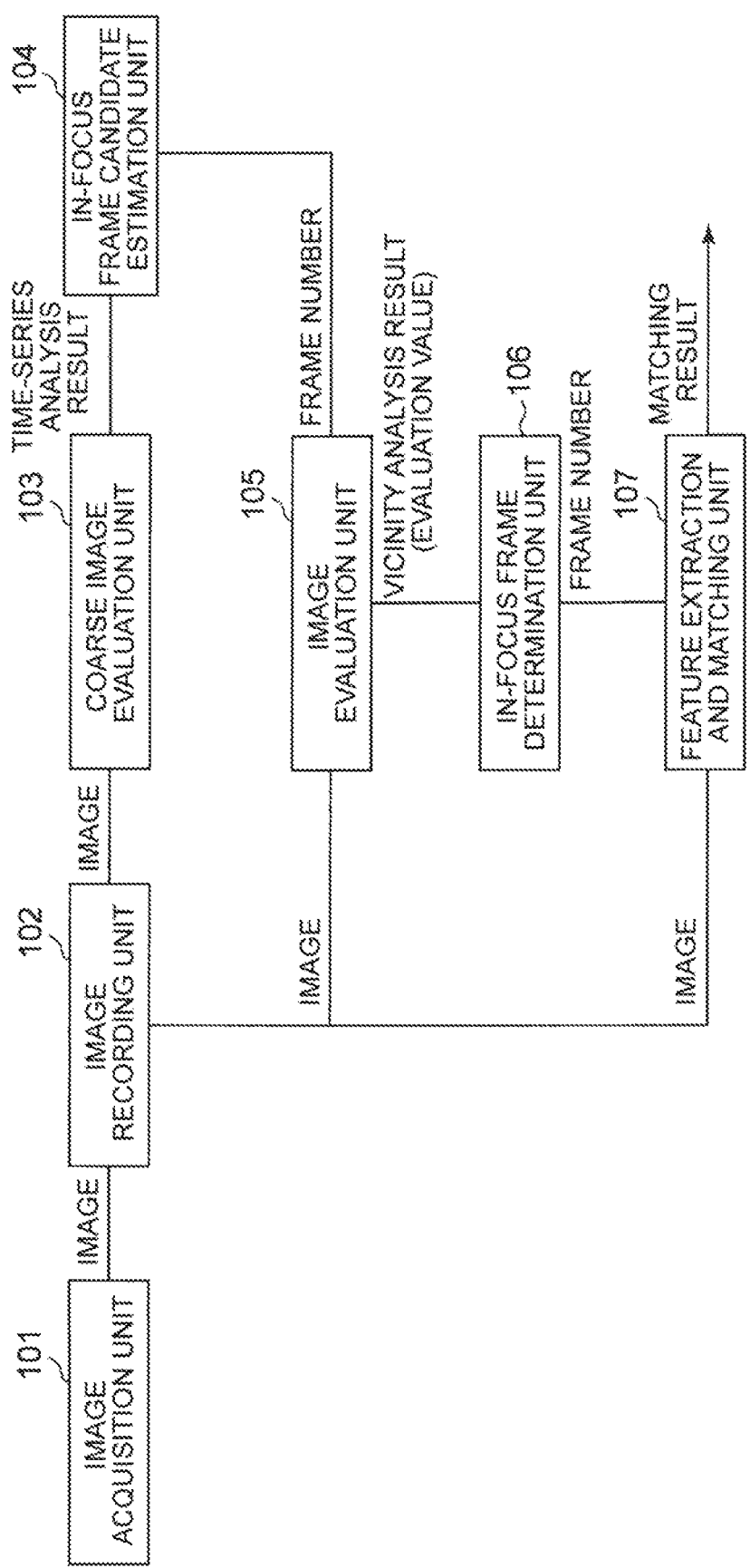
FIG. 2 It depicts a block diagram showing a configuration example of an image processing device.

FIG. 2 is a block diagram showing a configuration example of an image processing device.

The image processing device shown in FIG. 2 comprises an image acquisition unit 101, an image recording unit 102, a coarse image evaluation unit 103, an in-focus frame candidate estimation unit 104, an image evaluation unit 105, an in-focus frame determination unit 106, and a feature extraction and matching unit 107.

The image acquisition unit 101 sequentially inputs images of one subject (for example, an authenticated person) that have been captured in temporal succession by the imaging means. The image recording unit 102 is a memory that stores the images.

The coarse image evaluation unit 103 performs a coarse focus evaluation process in the coarse evaluation process described above (refer to (B) of FIG. 1). Specifically, the coarse image evaluation unit 103 generates a group of images in which images are temporally thinned out, and executes a process to determine the possibility that each image in the generated group of images is an image captured within the focusing range. The coarse image evaluation unit 103 outputs an evaluation value for each image as a result of the processing. The higher the probability that the image is an image captured within the focusing range (the probability that the image is in focus), the larger the evaluation value.

In addition, the coarse image evaluation unit 103 reduces the number of pixels and frames in the image so that the coarse evaluation process is completed at about the same time as all of the series of images are written to the image recording unit 102.

The in-focus frame candidate estimation unit 104 performs a process of estimating the in-focus frame candidates in the coarse evaluation process described above. As described above, the evaluation value is an evaluation value of an image in the group of images in which the number of images has been reduced by temporal thinning. Therefore, an optimal in-focus frame may not be obtained based on the evaluation value output by the coarse image evaluation unit 103.

The in-focus frame candidate estimation unit 104, for example, outputs the images of several frames before and after the image with the highest evaluation value (including the image with the highest evaluation value) as in-focus frame candidates. (including the image with the highest evaluation value) as in-focus frame candidates. The in-focus frame candidate estimation unit 104 outputs, for example, the frame number of the in-focus frame candidate. As an example, the serial number of the captured image is used as the frame number. The image data is stored in the image recording unit 102 in association with the frame number.

The image evaluation unit 105 performs an image evaluation process (refer to (C) of FIG. 1) for the in-focus frame candidate as targets to evaluate whether or not a candidate frame is truly in focus. In the image evaluation process, the image evaluation unit 105 uses the images stored in the image recording unit 102. In other words, the image evaluation unit 105 evaluates images that have not undergone thinning processing. The image evaluation unit 105 outputs, for example, the evaluation value of each in-focus frame candidate.

The in-focus frame determination unit 106 determines the in-focus frame candidate with the highest evaluation value as an in-focus frame. For example, the in-focus frame determination unit 106 outputs the frame number of the in-focus frame.

The feature extraction and matching unit 107 performs feature extraction on the image of the in-focus frame (equivalent to the matching image) and performs matching using a feature database, etc.

Example Embodiment 1

The first example embodiment of the image processing device is described with reference to a flowchart in FIG. 3. In the first example example embodiment, the image processing device performs temporal thinning of the captured images when estimating the in-focus frame candidates.

Figure 3:
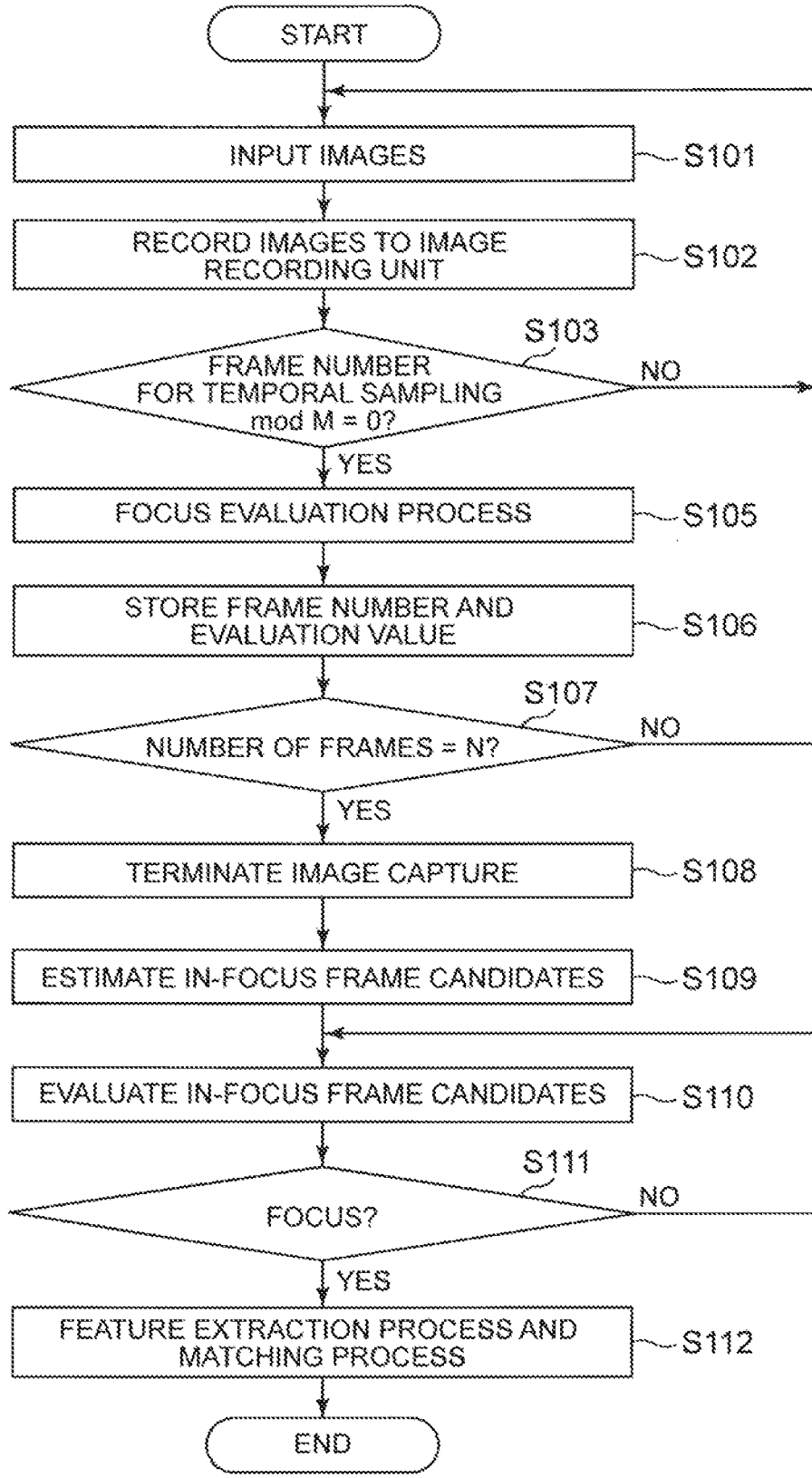
FIG. 3 It depicts a flowchart showing an operation of an image processing device of the first example embodiment.

In the process illustrated in FIG. 3, each time M (M: two or more natural numbers) frames of images are captured in the image recording unit 102, one frame of image is read out from the image recording unit 102, and focus evaluation is performed on the read out images. When a predetermined number of N (N: two or more natural numbers) frames of images have been captured, the processing moves to the process of estimating the in-focus frame candidates.

In the image processing device, the image acquisition unit 101 sequentially inputs images from the image capturing means (step S101). Then, the image acquisition unit 101 writes the input images to the image recording unit 102 (step S102).

After one frame of image has been recorded in the image recording unit 102, the coarse image evaluation unit 103 starts the coarse image processing. In the coarse image processing, time sampling is performed while the images are read out from the image recording unit 102. In the example shown in FIG. 3, the coarse image evaluation unit 103 performs the focus evaluation process every M frames (steps S103, S105). Therefore, when the image read from the image recording unit 102 is an image of the natural multiple of M, the coarse image evaluation unit 103 performs the focus evaluation process on that image.

The coarse image evaluation unit 103 performs the focus evaluation process in a known manner to calculate the evaluation value. For example, the coarse image evaluation unit 103 uses a high-pass filter to extract the high-frequency components of the image. Then, the coarse image evaluation unit 103 uses an average value of pixels after passing through the high-pass filter as the evaluation value. The coarse image evaluation unit 103 temporarily stores the evaluation value in association with the frame number (step S106).

The process of steps S101 to S106 is repeated until the number of captured images reaches N (step S107), and when the number of processed images reaches N, the capturing is terminated (step S108).

Next, the in-focus frame candidate estimation unit 104 estimates in-focus frame candidates (step S109). The in-focus frame candidates to be estimated are, for example, the image with the highest evaluation value and the images of several frames before and after it. The in-focus frame candidate estimation unit 104 outputs the frame numbers of those images to the image evaluation unit 105 as data that can identify the in-focus frame candidates. The number of in-focus frame candidates is selected so that time required for a series of processing is less than or equal to an allowable time (for example, 10 ms).

The image evaluation unit 105 reads the images of the in-focus frame candidates identified by the frame number from the image recording unit 102, and executes the focus evaluation process one image at a time for the read images to calculate the evaluation values (step S110). The focus evaluation process performed by the image evaluation unit 105 can be the same as the focus evaluation process performed by the coarse image evaluation unit 103.

Next, the in-focus frame determination unit 106 checks whether or not the image of the in-focus frame candidate is an in-focus image, based on the evaluation value calculated by the image evaluation unit 105 (step S111). In step S111, the in-focus frame determination unit 106 determines, for example, whether or not the evaluation value exceeds a predetermined threshold value (a threshold value at which it can be determined with certainty that the image is an in-focus image). When the evaluation value of the image of the in-focus frame candidate exceeds the threshold value, the in-focus frame determination unit 106 outputs the frame number of the in-focus frame candidate to the feature extraction and matching unit 107 as the frame number of the in-focus image (equivalent to the matching image).

The feature extraction and matching unit 107 performs feature extraction for the in-focus image and performs matching using a feature database or the like (step S112). The feature extraction and matching unit 107 may also perform feature extraction and matching processing using several images before and after the image identified by the frame number from the in-focus frame determination unit 106.

Figure 4:
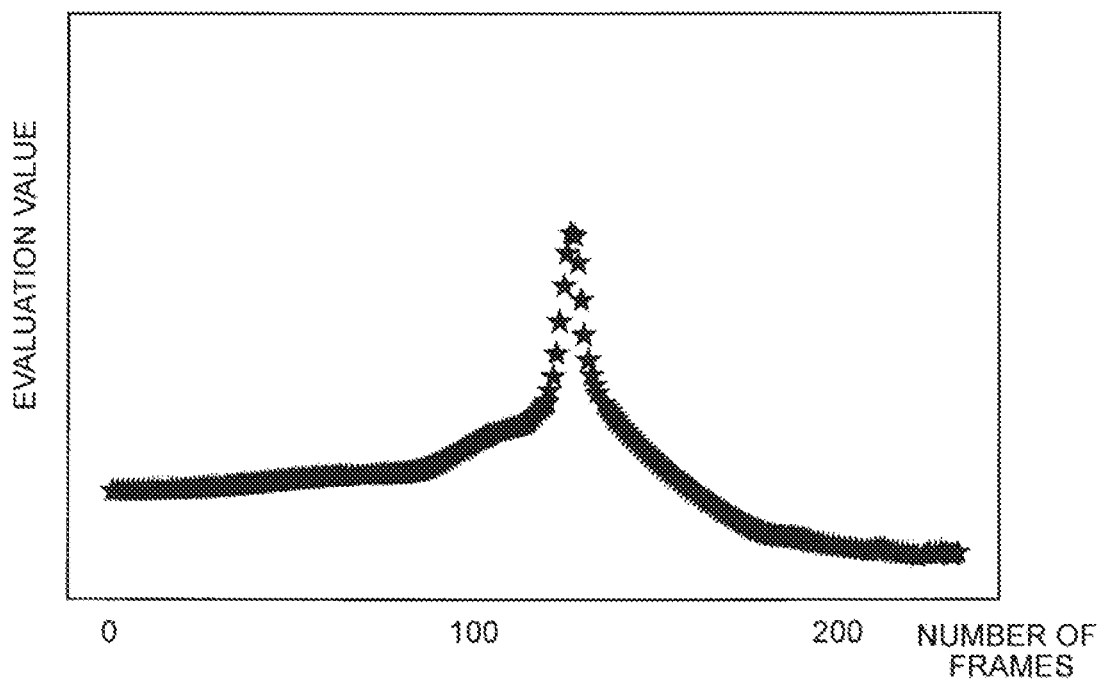
FIG. 4 It depicts an explanatory diagram showing an example of an evaluation result of a focus evaluation process.

FIG. 4 is an explanatory diagram showing an example of an evaluation result of the focus evaluation process. In the graph shown in FIG. 4, the horizontal axis indicates the number of frames and the vertical axis indicates the evaluation value. The example shown in FIG. 4 is a case where a moving subject is continuously photographed using a fixed-focus lens, and the focus evaluation process as described above is performed on the obtained 240 images. As shown in FIG. 4, there is a peak in the evaluation values (focus evaluation values) at a position while the subject moves, i.e., the frame number transitions.

Figure 5:
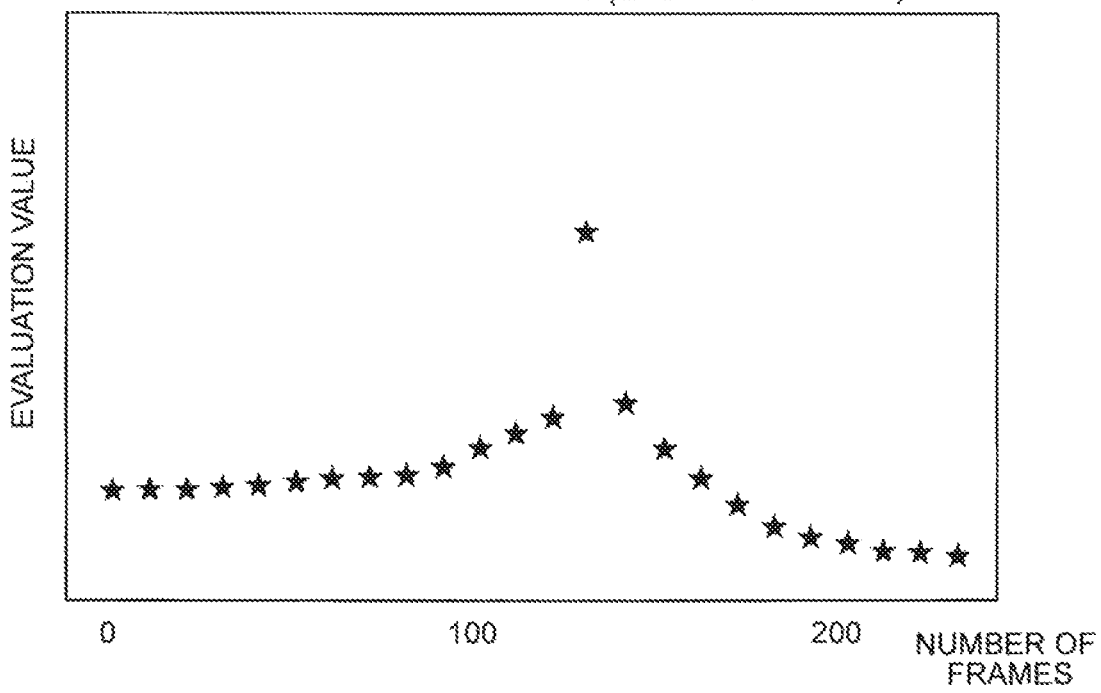
FIG. 5 It depicts an explanatory diagram showing an example of an evaluation result of a coarse image evaluation unit in the first example embodiment.

FIG. 5 is an explanatory diagram showing an example of an evaluation result of the coarse image evaluation unit 103 in this example embodiment. The example shown in FIG. 5 is a case where the coarse image evaluation unit 103 performs the focus evaluation process every 10 frames. As shown in FIG. 5, the peak of the evaluation value (refer to FIG. 4) is not compromised. Therefore, even if the images are thinned out in time as in this example embodiment, the in-focus frame determination unit 106 can still obtain an in-focus image. When the coarse image evaluation unit 103 executes the focus evaluation process every 10 frames, the overall processing time is reduced to 1/10.

Example Embodiment 2

The second example embodiment of the image processing device is described with reference to the flowchart in FIG. 6. In the second example embodiment, the image processing device performs a process of spatially thinning the captured image when estimating the in-focus frame candidates. The process of spatially thinning the image is a process of reducing the number of pixels in the image, or in other words, a process of reducing resolution.

The configuration of the image processing device of the second example embodiment is the same as the configuration shown in FIG. 2. However, in this example embodiment, the coarse image evaluation unit 103 generates an image in which pixels are spatially thinned out, and performs a process to determine probability that the generated image is an image captured within the focusing range.

Figure 6:
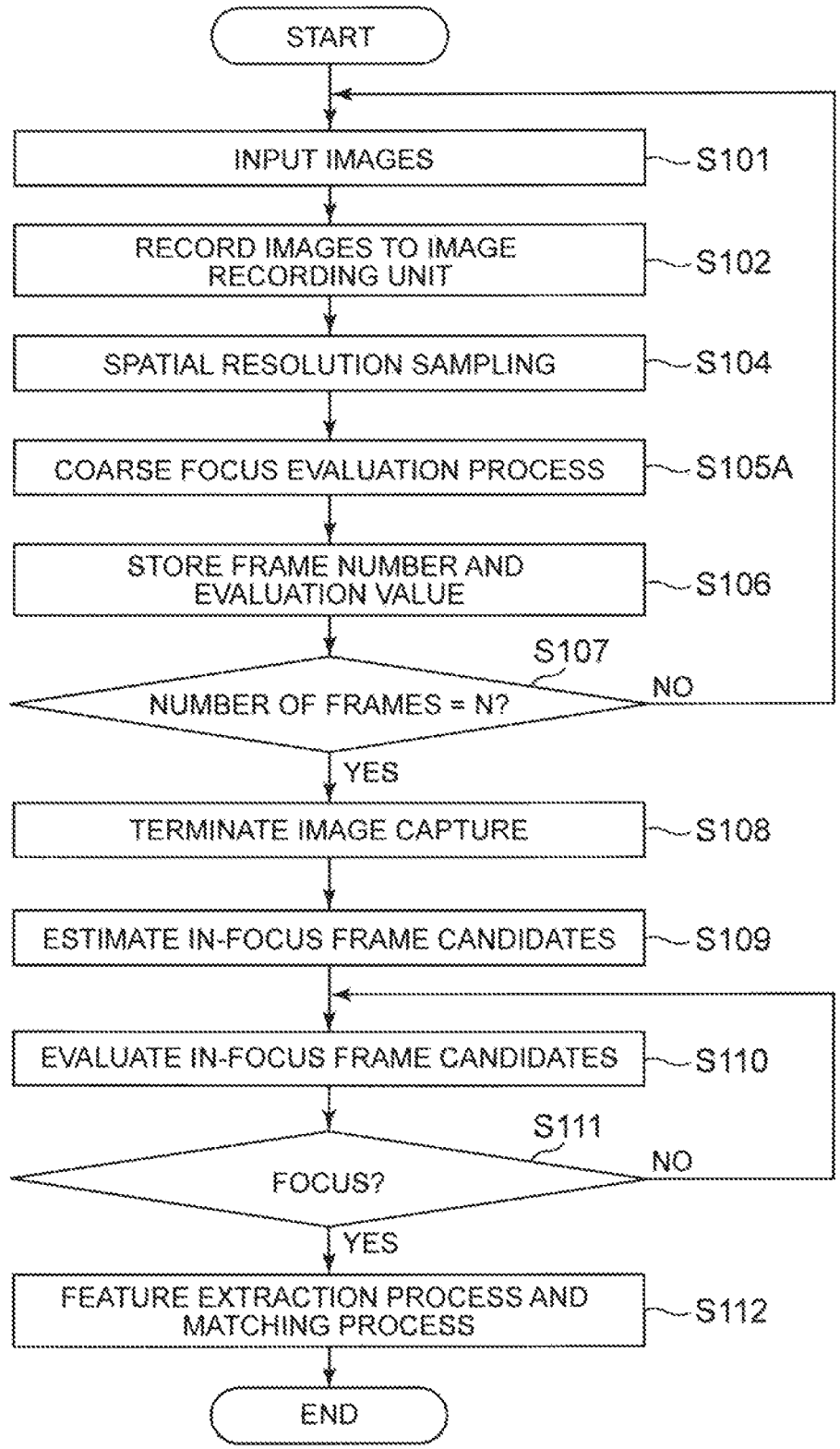
FIG. 6 It depicts a flowchart showing an operation of an image processing device of the second example embodiment.

The process shown in FIG. 6 is almost the same as the process of the image processing device of the first example embodiment shown in FIG. 3, but in this example embodiment, the process of step S103 shown in FIG. 3 is not performed, and instead, the process of step S104 is performed. In addition, the coarse image evaluation unit 103 executes a coarse focus evaluation process (step S105A). The coarse focus evaluation process means the focus evaluation process for images whose pixels are thinned. The other processes are the same as processes shown in FIG. 3.

Figure 7:
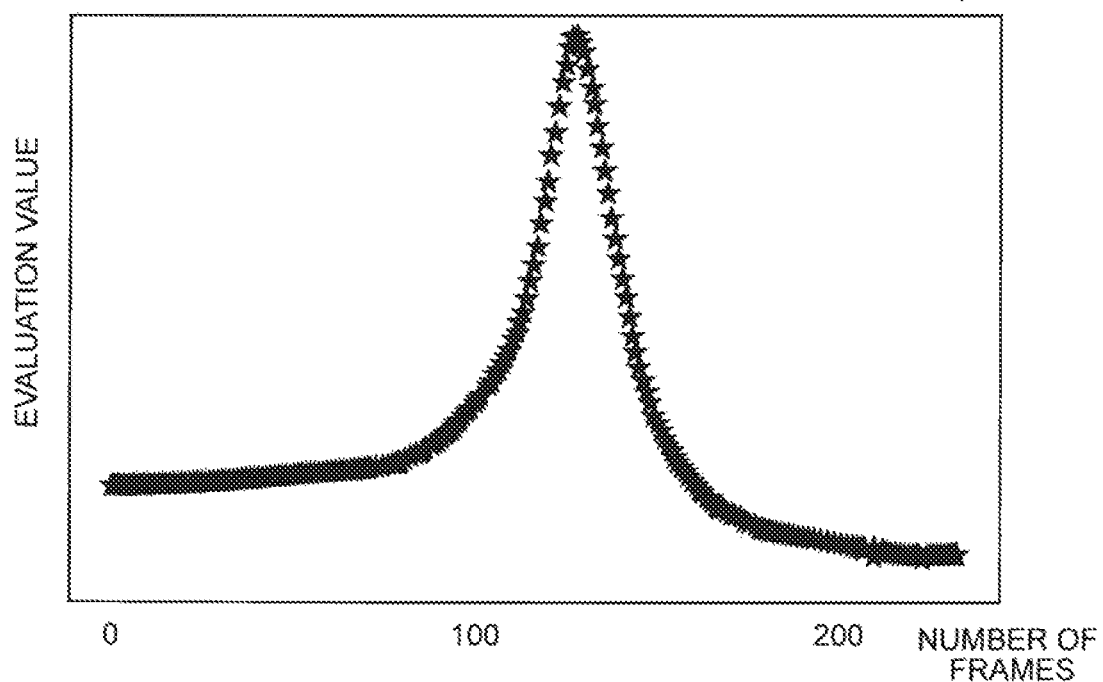
FIG. 7 It depicts an explanatory diagram showing an example of an evaluation result of a coarse image evaluation unit in the second example embodiment.

FIG. 7 is an illustration of an example of an evaluation result of the coarse image evaluation unit 103 in this example embodiment. The example shown in FIG. 7 is a case where the coarse image evaluation unit 103 has thinned out three pixels for every four pixels about the height and width of the image. Therefore, the image size becomes ¼ of the original size. The coarse image evaluation unit 103 performs the focus evaluation process on the spatially thinned image. When three pixels are thinned out for every four pixels, since the number of pixels to be processed is reduced to ¹⁄₁₆, the overall processing time is reduced to ¹⁄₁₆.

In addition, as shown in FIG. 7, the peak of the evaluation value (refer to FIG. 4) is not compromised. Therefore, even if the images are thinned out in time as in this example embodiment, the in-focus frame determination unit 106 can still obtain an in-focus image.

Example Embodiment 3

The third example embodiment of the image processing device is described with reference to the flowchart in FIG. 8. In the third example embodiment, the image processing device performs temporal thinning of the captured image as well as spatial thinning of pixels when estimating the in-focus frame candidates.

The configuration of the image processing device of the third example embodiment is the same as the configuration shown in FIG. 2. However, in this example embodiment, the coarse image evaluation unit 103 intermittently selects images from the time-series images comprising the captured image group, as in the case of the first example embodiment, and generates the thinned images by performing pixel thinning on the selected images, as in the case of the second example embodiment. Then, the coarse image evaluation unit 103 performs a process to determine probability that the generated image is an image captured within the focusing range.

Figure 8:
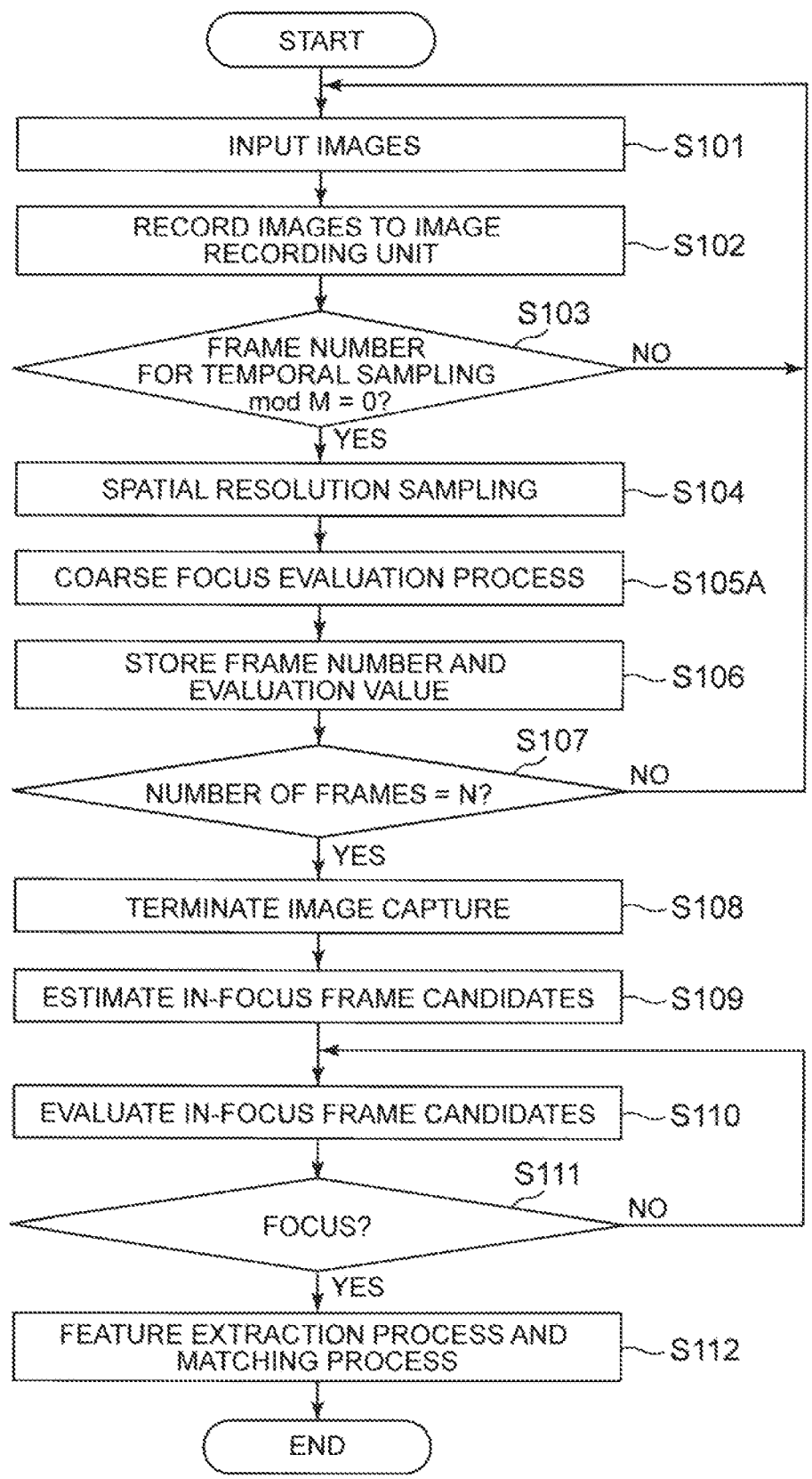
FIG. 8 It depicts a flowchart showing an operation of an image processing device of the third example embodiment.

In other words, in the process shown in FIG. 8, the process of step S103 shown in FIG. 3 and the process of step S104 shown in FIG. 6 are both executed.

Specifically, the coarse image evaluation unit 103 first performs temporal sampling in the coarse image processing. In the example shown in FIG. 8, the coarse image evaluation unit 103 selects an image every M frames from a group of images (step S103). The coarse image evaluation unit 103 performs the coarse focus evaluation process on the selected images (steps S104, S105A).

The other processes are the same as processes shown in FIG. 3 and FIG. 6.

Figure 9:
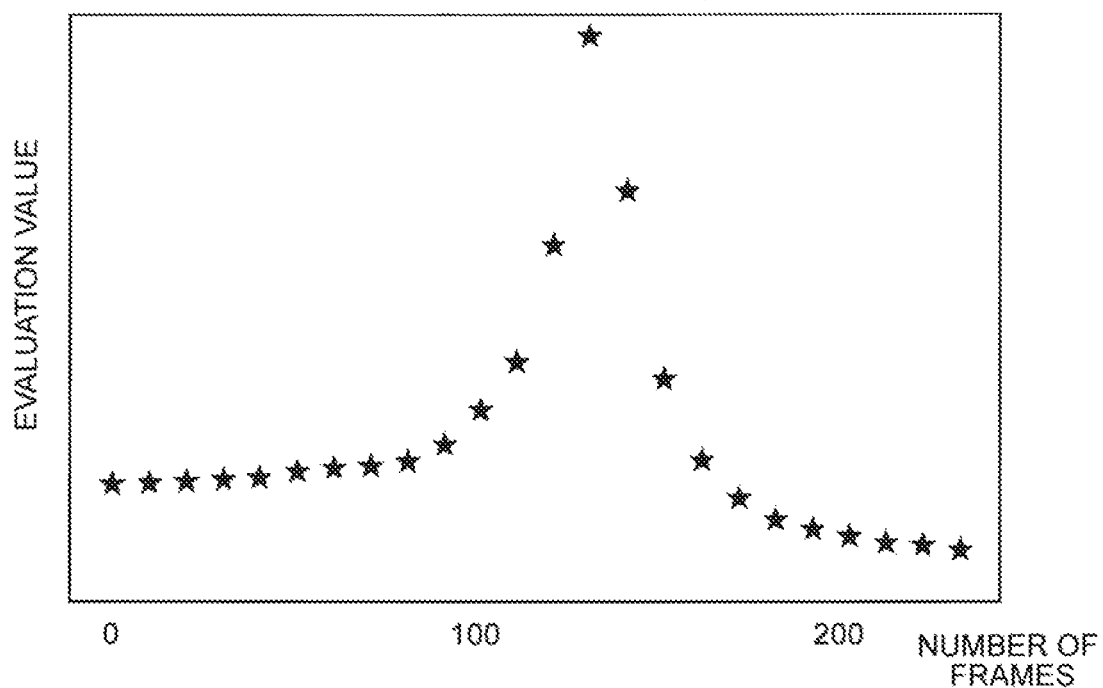
FIG. 9 It depicts an explanatory diagram showing an example of an evaluation result of a coarse image evaluation unit in the third example embodiment.

FIG. 9 is an explanatory diagram showing an example of an evaluation result of the coarse image evaluation unit 103 in this example embodiment. The example shown in FIG. 9 is a case where the coarse image evaluation unit 103 selects an image of one frame every 10 frames, and thins out three pixels for every four pixels about the height and width of the selected image. Therefore, the overall processing time is expected to be reduced to (¹⁄₁₀)×(¹⁄₁₆).

In addition, as shown in FIG. 9, the peak of the evaluation value (refer to FIG. 4) is not compromised. Therefore, even if the images are thinned out in time as in this example embodiment, the in-focus frame determination unit 106 can still obtain an in-focus image.

When the in-focus frame candidate estimation unit 104 outputs the images of several frames before and after the image with the highest evaluation value as the in-focus frame candidates, the number of frames before and after may be twice the thinning interval, for example, when temporal thinning is performed. Specifically, if the number of images to be captured is N=240, and the coarse image evaluation unit 103 selects an image of one frame every 10 frames, the number of frames before and after should be 20. In this case, the number of images to be subjected to coarse image processing is ¹⁄₁₂ of N.

When determining the in-focus frame candidates, the in-focus frame candidate estimation unit 104 may generate a dense time-series evaluation value from the series of evaluation values calculated by the coarse image evaluation unit 103 by interpolation using spline approximation or other methods.

Figure 10:
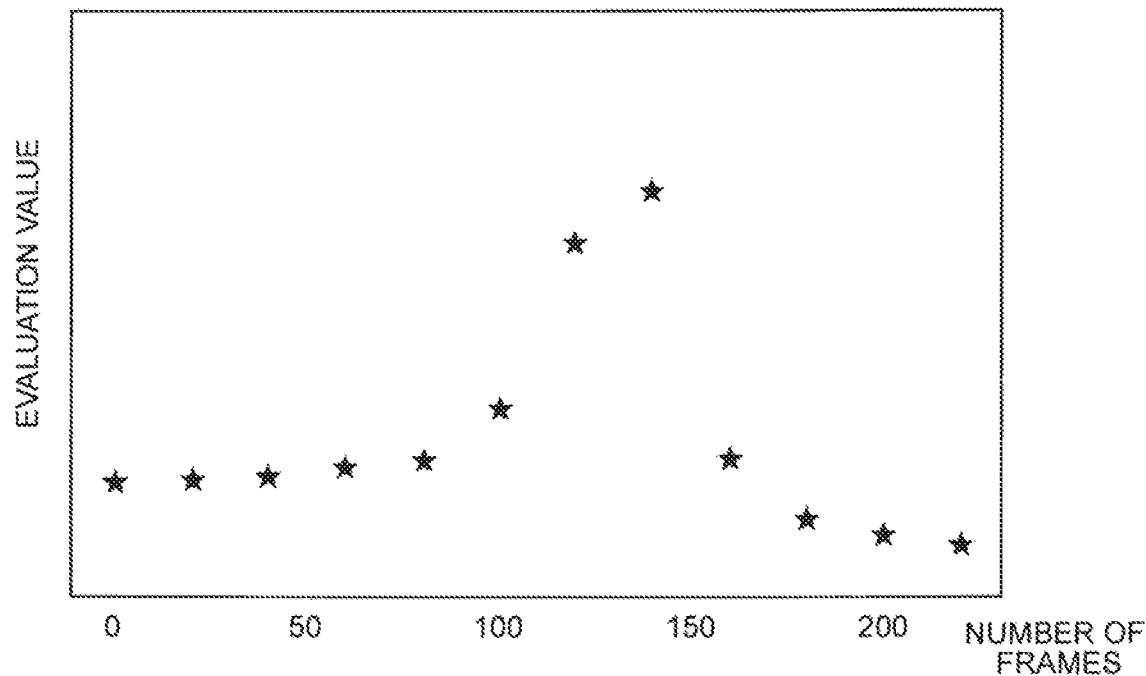
FIG. 10 It depicts an explanatory diagram showing an example of a time series evaluation value generated without using spline approximation.
Figure 11:
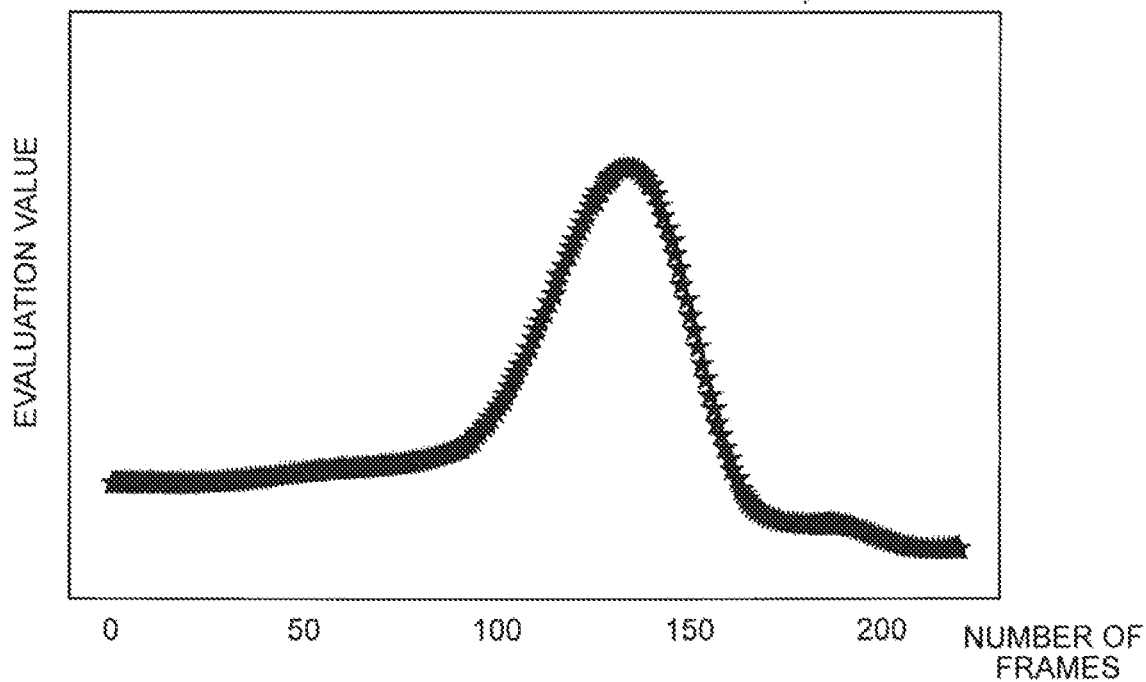
FIG. 11 It depicts an explanatory diagram showing an example of a time series evaluation value generated using spline approximation.

FIG. 10 and FIG. 11 are an explanatory diagram explaining an effect of spline approximation. FIG. 10 is an explanatory diagram showing an example of a time series evaluation value generated without using spline approximation. Specifically, FIG. 10 illustrates an example of a case where the coarse image evaluation unit 103 selects an image of one frame every 20 frames and thins out three pixels for every four pixels about the height and width of the selected image.

FIG. 11 is an explanatory diagram showing an example of a time series evaluation value generated using spline approximation. FIG. 11 also shows an example of a case where the coarse image evaluation unit 103 selects an image of one frame every 20 frames and thins out three pixels for every four pixels about the height and width of the selected image, but by further spline approximation, a dense series of evaluation values is generated. By using the dense evaluation values to determine the in-focus frame candidates, the in-focus frame candidate estimation unit 104 can determine the in-focus frame candidates more accurately.

Comparing the example shown in FIG. 10 with the example shown in FIG. 11, it is understood that spline approximation can be used to make the peak of the evaluation value appear even when the peak of the evaluation value is compromised (the true peak does not appear) when spline approximation is not used.

In addition, in the above example embodiments, when determining the in-focus frame candidates based on the image with the highest evaluation value (assumed to be the central in-focus frame candidate) in the process of step S109 (refer to FIG. 3, etc.), the in-focus frame candidate estimation unit 104 performs the focus evaluation process sequentially for the images identified by all the frame numbers output from the coarse image evaluation unit 103.

However, a threshold value may be set in advance to ensure that an in-focus image is obtained, and when the in-focus frame candidate estimation unit 104 detects an evaluation value that exceeds the threshold value, the in-focus frame candidate estimation unit 104 may set the image identified by the frame number corresponding to the evaluation value as the central in-focus frame candidate. In such a case, the process moves to step S110 without executing remaining processes for evaluation values.

As illustrated in FIG. 4, etc., the series of evaluation values forms a shape with a peak. Taking advantage of this, when an evaluation value below the threshold is detected after an evaluation value exceeding the threshold is detected in the process of step S109, the process may move to step S110 without executing remaining processes for evaluation values. In such a configuration, for example, the evaluation value that exists in the middle between the evaluation value that first exceeded the threshold and the evaluation value immediately before the evaluation value less than or equal to the threshold is detected is utilized. Therefore, the in-focus frame candidate estimation unit 104 sets the image identified by the frame number corresponding to the evaluation value as the central in-focus frame candidate.

As explained above, the image processing device of each of the above example embodiments starts the coarse evaluation process at the same time as the capture starts (strictly speaking, it starts when at least one image is written to the image recording unit 102). Then, since the coarse focus evaluation process is performed on the images in the image group in the image processing device, the time from the start of capture to the calculation of a result of the matching process is shortened. Therefore, it is possible to increase the number of authenticated persons who can be authenticated in a predetermined time.

In order to enable more accurate authentication processing, the image processing device may include a function (function to narrow down the evaluation area) to detect the area (for example, eye position) including the target of the authentication process from the image. The image processing device may then perform the focus evaluation process after narrowing down the evaluation area.

Figure 12:
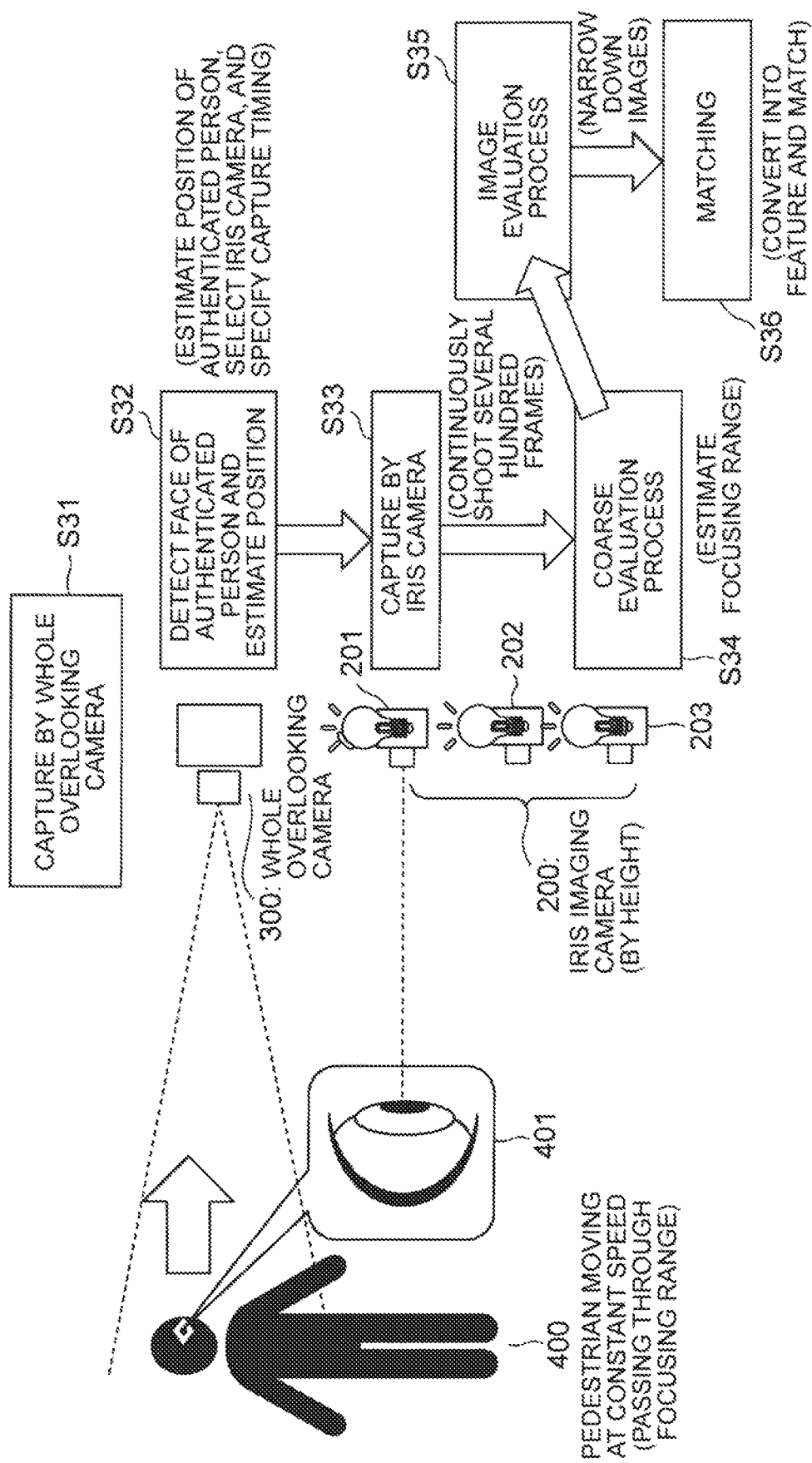
FIG. 12 It depicts an explanatory diagram showing a structure and a function of walk-through iris authentication system.

Example 1 hereinafter, an example of the image processing device is explained with reference to an explanatory diagram in FIG. 12. This example is an example where the image processing device of the above example embodiment is applied to walk-through iris authentication system (hereinafter referred to as the system). This is an example in which the image processing device of the above example embodiment is applied to walk-through iris authentication system (hereinafter referred to as the system). The walk-through authentication is used for entry/exit control such as at an entrance gate. In this example, it is assumed that if a registrant (for example, a person who is qualified to pass through an entrance gate) can be authenticated (verified), the registrant will pass through the gate non-stop.

If the authenticated person 400 is correctly matched, it should be able to pass through the gate without stopping while walking. For example, for an iris image captured at a distance of about 2 m from the gate, it is required that the matching result is calculated between a period when the authenticated person 400 passes through the 0 m point (entry gate point) from the 2 m distance point.

The system includes an whole overlooking camera 300 and an iris imaging camera 200 with a plurality of infrared lights and cameras 201, 202, 203 arranged vertically. The whole overlooking camera 300 captures an area including the face of the authenticated person 400 (step S31). Then, a control unit (not shown) in the system performs face detection of the authenticated person 400. The control unit also estimates the distance between the authenticated person 400 and the iris imaging camera 200 (step S32). Furthermore, the control unit selects a camera that matches the height of the authenticated person 400.

The control unit estimates the position of the authenticated person 400 based on the size of the face of the authenticated person 400 or other factors. Then, the control unit activates the camera selected at the moment when the authenticated person 400 approaches the focus position, with the position of the eyes of the authenticated person 400 as the ROI (Region Of Interest), i.e., the area to be processed.

In step S33, the iris imaging camera 200 outputs the captured images 401 to the image acquisition unit 101 (refer to FIG. 2) in the image processing device of the above example embodiments for a few seconds after it is activated. The image acquisition unit 101 sequentially stores the input images in the image recording unit 102.

Immediately after the first captured image is stored in the image recording unit 102, the coarse image evaluation unit 103 sequentially reads the images stored in the image recording unit 102 and performs the coarse evaluation process (step S34). In the coarse evaluation process, as described above, the focus evaluation process of the image is performed, while the image is thinned in the time direction or the resolution of the image is reduced (spatial thinning), or both.

Then, the image evaluation unit 105 performs focus evaluation on multiple images of the in-focus frame candidates before and after the image with the large evaluation value (step S35). Then, the feature extraction and matching unit 107 extracts the features of the obtained in-focus images (matching images) and performs the matching process using a database or the like.

Although in this example, walk-through authentication is used as an example, the above example embodiments can be applied to other biometric authentication as well as iris authentication. In particular, they are suitable for authentication using images that require a high resolution of about 0.06 mm per pixel.

Example 2

Next, an example of authentication other than walk-through authentication is described.

As an example of authentication other than walk-through authentication, authentication is taken as an example in which the focus position is changed for a stationary subject and a group of in-focus images is input.

For example, consider the case of matching an iris of a stationary subject whose distance from the camera is known to some extent. In this case, the lens drive range is limited. By driving the lens with a voice coil motor or by driving a liquid lens, etc., a series of images with continuously changing focus position can be obtained. In this example, no processing such as feeding back a sensing result to the focus drive mechanism is required. Therefore, high-speed continuous image capture becomes to be possible.

As in each of the above example embodiments, immediately after the first captured image is stored in the image recording unit 102, images are sequentially read from the image recording unit 102. Thereafter, the coarse image evaluation unit 103, the in-focus frame candidate estimation unit 104, the image evaluation unit 105, the in-focus frame determination unit 106, and the feature extraction and matching unit 107 shown in FIG. 2 perform the above-described processes.

Therefore, the image processing device of the above example embodiments can also take pictures of a stationary matching subject at high speed and reduce the time from the start of shooting to the output of the matching result.

Figure 13:
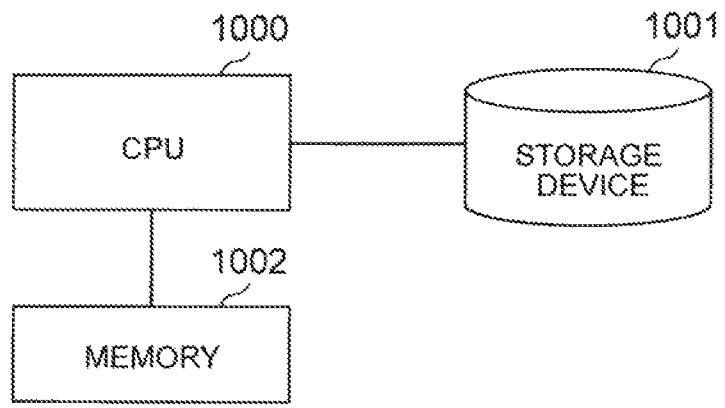
FIG. 13 It depicts a block diagram showing an example of a computer with a CPU.

FIG. 13 is a block diagram showing an example of a computer having a CPU (Central Processing Unit). The CPU 1000 executes processing in accordance with an image processing program stored in the storage device 1001 to realize the functions in the above example embodiments.

In other words, the CPU 1000 realizes the functions of the image acquisition unit 101, the coarse image evaluation unit 103, the in-focus frame candidate estimation unit 104, the image evaluation unit 105, the in-focus frame determination unit 106, and the feature extraction and matching unit 107 shown in FIG. 2.

The storage device 1001 is, for example, a non-transitory computer readable medium. The non-transitory computer readable medium includes various types of tangible storage media. Specific example of the non-transitory computer readable medium includes a semiconductor memory (for example, a mask ROM, a PROM (programmable ROM), an EPROM (erasable PROM), a flash ROM).

The memory 1002 is realized, for example, by a RAM (Random Access Memory), and is storage means for temporarily storing data when the CPU 1000 executes processing. The image recording unit 102 shown in FIG. 2 can be realized by the memory 1002.

Figure 14:
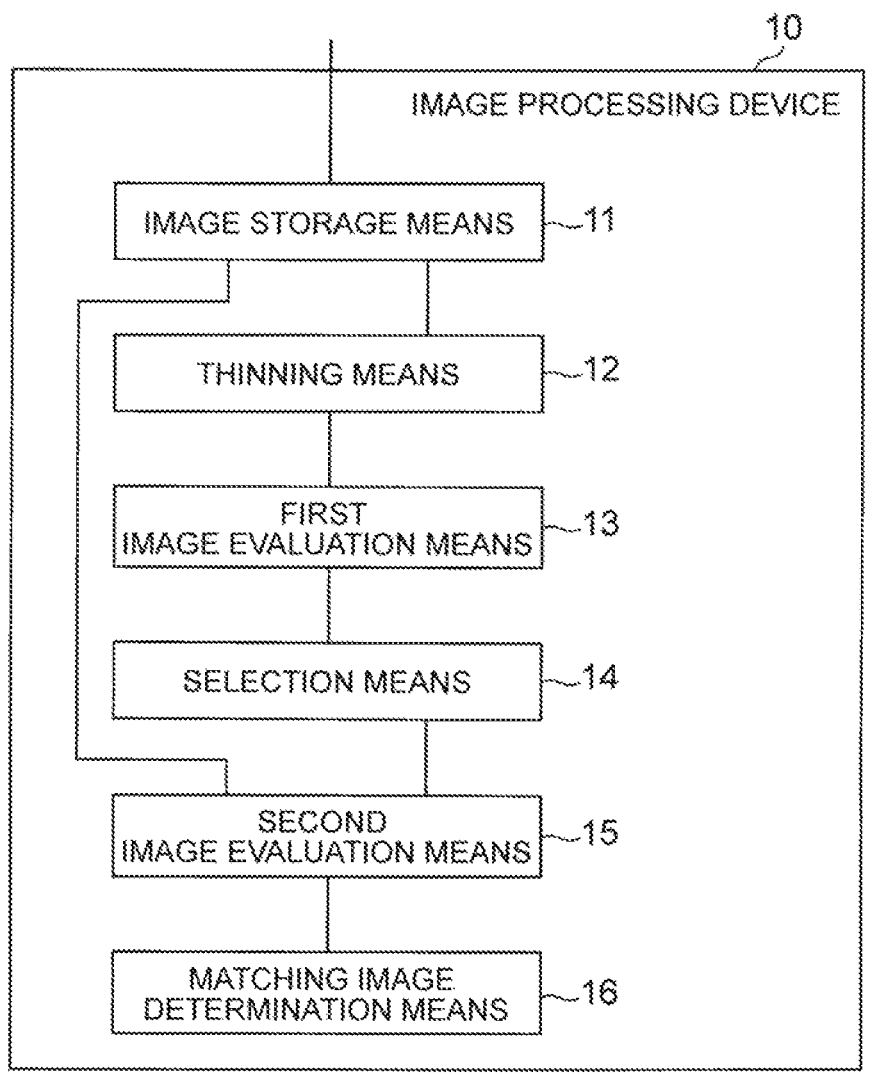
FIG. 14 It depicts a summarized block diagram showing an image processing device.

FIG. 14 is a summarized block diagram showing the image processing device. The image processing apparatus 10 comprises image storage means 11 (in the example embodiments, realized by the image recording unit 102) for sequentially storing a plurality of images continuously captured in time, thinning means 12 (in the example embodiments, realized by the coarse image evaluation unit 103) for performing a thinning process for the images continuously captured in time, first image evaluation means 13 (in the example embodiments, realized by the coarse image evaluation unit 103) for performing first focus evaluation on the images (for example, the process of step S105, S105A) after the thinning process is performed, selection means 14 (in the example embodiments, realized by the in-focus frame candidate estimation unit 104) for selecting a plurality of in-focus frame candidates from the images continuously captured in time, second image evaluation means 15 (in the example embodiment, realized by the image evaluation unit 105) for reading the images of the in-focus frame candidates selected by the selection means 14 from the image storage means 11 and performing second focus evaluation (for example, the process of step S110) on the read images, and matching image determination means 16 (in the example embodiments, realized by the in-focus frame determination unit 106) for selecting a matching image for an authentication process from the images of the in-focus frame candidates based on an evaluation result of the second focus evaluation.

A part of or all of the above example embodiments may also be described as, but not limited to, the following supplementary notes.

(Supplementary note 1) An image processing device comprising:
image storage means for sequentially storing a plurality of images continuously captured in time,
thinning means for performing a thinning process for the images continuously captured in time,
first image evaluation means for performing first focus evaluation on the images after the thinning process is performed,
selection means for selecting a plurality of in-focus frame candidates from the images continuously captured in time, based on an evaluation result of the first focus evaluation,
second image evaluation means for reading the images of the in-focus frame candidates selected by the selection means from the image storage means and performing second focus evaluation on the read images, and
matching image determination means for selecting a matching image for an authentication process from the images of the in-focus frame candidates, based on an evaluation result of the second focus evaluation.

(Supplementary note 2) The image processing device according to Supplementary note 1, wherein
the first image evaluation means outputs an evaluation value that is higher the higher the probability that the image is in focus as an evaluation result of the first focus evaluation, and
the selection means sets the image with the highest evaluation value and the images captured before and after the image as the in-focus frame candidates.

(Supplementary note 3) The image processing device according to Supplementary note 1 or 2, wherein
the thinning means performs a selecting process, as the thinning process, of selecting images intermittently from an image group including the images continuously captured in time.

(Supplementary note 4) The image processing device according to any one of Supplementary notes 1 to 3, wherein
the thinning means performs a process, as the thinning process, of thinning pixels for each of the images continuously captured in time.

(Supplementary note 5) The image processing device according to any one of Supplementary notes 1 to 4, wherein
the thinning means starts the thinning process immediately when the first image is stored in the image storage means.

(Supplementary note 6) An image processing method comprising:
sequentially storing a plurality of images continuously captured in time in image storage means,
performing a thinning process for the images continuously captured in time,
performing first focus evaluation on the images after the thinning process is performed,
selecting a plurality of in-focus frame candidates from the images continuously captured in time, based on an evaluation result of the first focus evaluation,
reading the images of the in-focus frame candidates selected from the image storage means and performing second focus evaluation on the read images, and
selecting a matching image for an authentication process from the images of the in-focus frame candidates, based on an evaluation result of the second focus evaluation.

(Supplementary note 7) The image processing method according to Supplementary note 6, wherein
an evaluation value that is higher the higher the probability that the image is in focus is output as an evaluation result of the first focus evaluation, and
the image with the highest evaluation value and the images captured before and after the image are set as the in-focus frame candidates.

(Supplementary note 8) The image processing method according to Supplementary note 6 or 7, wherein
when performing the thinning process, selecting images intermittently from an image group including the images continuously captured in time is performed.

(Supplementary note 9) The image processing method according to any one of Supplementary notes 6 to 8, wherein
when performing the thinning process, thinning pixels for each of the images continuously captured in time is performed.

(Supplementary note 10) The image processing method according to any one of Supplementary notes 6 to 9, further comprising starting the thinning process immediately when the first image is stored in the image storage means.

(Supplementary note 11) An image processing program causing a computer to execute:
a process of sequentially storing a plurality of images continuously captured in time in image storage means,
a process of performing a thinning process for the images continuously captured in time,
a process of performing first focus evaluation on the images after the thinning process is performed, a process of selecting a plurality of in-focus frame candidates from the images continuously captured in time, based on an evaluation result of the first focus evaluation, a process of reading the images of the in-focus frame candidates selected from the image storage means and performing second focus evaluation on the read images, and a process of selecting a matching image for an authentication process from the images of the in-focus frame candidates, based on an evaluation result of the second focus evaluation.

(Supplementary note 12) The image processing program according to Supplementary note 11, causing the computer to execute a process of outputting an evaluation value that is higher the higher the probability that the image is in focus as an evaluation result of the first focus evaluation, and a process of setting the image with the highest evaluation value and the images captured before and after the image as the in-focus frame candidates.

(Supplementary note 13) The image processing program according to Supplementary note 11 or 12, causing the computer to execute a selecting process, as the thinning process, of selecting images intermittently from an image group including the images continuously captured in time.

(Supplementary note 14) The image processing program according to any one of Supplementary notes 11 to 13, causing the computer to execute a process, as the thinning process, of thinning pixels for each of the images continuously captured in time.

(Supplementary note 15) The image processing program according to any one of Supplementary notes 11 to 14, causing the computer to start the thinning process immediately when the first image is stored in the image storage means.

While the present invention has been described with reference to the example embodiments, the present invention is not limited to the aforementioned example embodiments. Various changes understandable to those skilled in the art within the scope of the present invention can be made to the structures and details of the present invention.

This application claims priority based on Japanese Patent Application No. 2019-055809 filed on Mar. 25, 2019, the disclosures of which are incorporated herein in their entirety.

REFERENCE SIGNS LIST

10 Image processing device
11 Image storage means
12 Thinning means
13 First image evaluation means
14 Selection means
15 Second image evaluation means
16 Matching image determination means
101 Image acquisition unit
102 Image recording unit
103 Coarse image evaluation unit
104 In-focus frame candidate estimation unit
105 Image evaluation unit
106 In-focus frame determination unit
107 Feature extraction and matching unit
200 Iris imaging camera
201, 202, 203 Camera
300 Whole overlooking camera
400 Authenticated person
1000 CPU
1001 Storage device
1002 Memory

What is claimed is:

1. An image processing device comprising:
one or more processors; and
a memory storing instructions executable by the one or more processors to:
sequentially store a plurality of images continuously captured in time,
thin the images continuously captured in time,
perform first focus evaluation on the images after thinning is performed,
select a plurality of in-focus frame candidates from the images continuously captured in time, based on an evaluation result of the first focus evaluation,
read the images of the in-focus frame candidates selected from the images as have been stored and perform second focus evaluation on the read images, and
select a matching image for authentication from the images of the in-focus frame candidates, based on an evaluation result of the second focus evaluation.

2. The image processing device according to claim 1, wherein
the instructions are executable by the one or more processors to further:
output an evaluation value that is higher as a probability that the image is in focus is higher, as an evaluation result of the first focus evaluation, and
set the image with a highest evaluation value and the images captured before and after the image as the in-focus frame candidates.

3. The image processing device according to claim 1, wherein
the instructions are executable by the one or more processors to thin the images by selecting images intermittently from an image group including the images continuously captured in time.

4. The image processing device according to claim 1, wherein
the instructions are executable by the one or more processors to thin the images by thinning pixels for each of the images continuously captured in time.

5. The image processing device according to claim 1, wherein
the instructions are executable by the one or more processors to start thinning the images when a first image is stored.

6. The image processing device according to claim 2, wherein
the instructions are executable by the one or more processors to thin the images by selecting images intermittently from an image group including the images continuously captured in time.

7. The image processing device according to claim 2, wherein
the instructions are executable by the one or more processors to thin the images by thinning pixels for each of the images continuously captured in time.

8. The image processing device according to claim 3, wherein
the instructions are executable by the one or more processors to thin the images by thinning pixels for each of the images continuously captured in time.

9. The image processing device according to claim 2, wherein the instructions are executable by the one or more processors to start thinning the images when a first image is stored.

10. The image processing device according to claim 3, wherein
the instructions are executable by the one or more processors to start thinning the images when a first image is stored.

11. The image processing device according to claim 4, wherein
the instructions are executable by the one or more processors to start thinning the images when a first image is stored.

12. An image processing method comprising:
sequentially storing a plurality of images continuously captured in time,
thinning the images continuously captured in time,
performing first focus evaluation on the images after thinning is performed,
selecting a plurality of in-focus frame candidates from the images continuously captured in time, based on an evaluation result of the first focus evaluation,
reading the images of the in-focus frame candidates selected from the images as have been stored and performing second focus evaluation on the read images, and
selecting a matching image for authentication from the images of the in-focus frame candidates, based on an evaluation result of the second focus evaluation.

13. The image processing method according to claim 12, wherein
thinning the images includes selecting images intermittently from an image group including the images continuously captured in time.

14. The image processing method according to claim 12, wherein
thinning the images includes thinning pixels for each of the images continuously captured in time.

15. The image processing method according to claim 12, further comprising starting the thinning when a first image is stored.

16. The image processing method according to claim 13, wherein
thinning the images includes thinning pixels for each of the images continuously captured in time.

17. The image processing method according to claim 13, further comprising starting the thinning when a first image is stored.

18. The image processing method according to claim 14, further comprising starting the thinning when a first image is stored.

19. The image processing method according to claim 12, further comprising
outputting an evaluation value that is higher as a the probability that the image is in focus is higher, an evaluation result of the first focus evaluation, wherein
the image with a highest evaluation value and the images captured before and after the image are set as the in-focus frame candidates.

20. A non-transitory computer readable recording medium storing an image processing program which, when executed by a processor, performs:
sequentially storing a plurality of images continuously captured in time,
thinning the images continuously captured in time,
performing first focus evaluation on the images after thinning is performed,
selecting a plurality of in-focus frame candidates from the images continuously captured in time, based on an evaluation result of the first focus evaluation,
reading the images of the in-focus frame candidates selected from the images as have been stored and performing second focus evaluation on the read images, and
selecting a matching image for authentication process from the images of the in-focus frame candidates, based on an evaluation result of the second focus evaluation.

* * * * *